United States Patent [19]

Leszczynska et al.

[11] 4,263,012

[45] Apr. 21, 1981

[54] METHOD OF GRANULATION OF SULFUR

[75] Inventors: Halina Leszczynska, Warsaw; Michal Gulcz, Gdansk-Wrzeszcz; Zdzislaw Januszewski, Gdansk-Wrzeszcz; Czeslaw Godlewski, Gdansk-Wrzeszcz; Zdzislaw Gorczyca; Norbert Janota, both of Katowice, all of Poland

[73] Assignee: Instytut Przemyslu Organicznego, Warsaw, Poland

[21] Appl. No.: 91,776

[22] Filed: Nov. 6, 1979

[30] Foreign Application Priority Data

Dec. 1, 1978 [PL] Poland .................................. 211429

[51] Int. Cl.³ ............................................. C01B 17/02
[52] U.S. Cl. .................................. 23/313 FB; 264/14
[58] Field of Search .......... 23/293 A, 293 S, 313 FB; 423/567 R, 567 A, 578 R; 264/12, 13, 14

[56] References Cited

U.S. PATENT DOCUMENTS

| 3,231,413 | 1/1966  | Berquin ...................... 23/313 FB X |
| 3,538,200 | 11/1970 | Hite ......................................... 264/13 |
| 3,689,226 | 9/1972  | Stoddard ........................ 23/293 S X |
| 3,838,979 | 10/1974 | Sims ...................................... 23/293 S |
| 4,031,174 | 6/1977  | Bennett ................................. 264/14 |
| 4,190,622 | 2/1980  | Landis ................................... 264/14 |

Primary Examiner—William A. Cuchlinski, Jr.

[57] ABSTRACT

The method consists in a counter-current introducing of liquid sulfur into a vertical stream of air, having the linear velocity increasing downwards, from a velocity lower than the critical velocity of sulfur dust in the sprinkling zone to a velocity higher than the critical velocity of formed granule in the zone of intensive cooling. As an additional cooling medium water can be employed, introduced in form of a mist at the place of emission of the air from the column into the ambient atmosphere.

The variable velocity of air is achieved through employing in the granulating apparatus the cross-sectional area increasing from the smallest in the zone of intensive cooling to the maximum area in the sprinking zone.

After the method according to the invention granules can be produced, having any grain characteristic, high selectivity and smooth spherically formed surface, and high mechanical strength.

3 Claims, No Drawings

METHOD OF GRANULATION OF SULFUR

This invention relates to a method of granulation of sulphur consisting in solidification of drops of liquid sulfur in a counter-current air stream.

From the Polish Patent Specification No. 48,911 is known a method of granulation of sulfur consisting in the solidifying of drops of sulfur in air with the formation of aerosol from a dispersion of sulfur powder and air by the way of atomization of liquid sulfur under a pressure of 3–4 g.atm by means of a nozzle. The time of falling-down of drops is relatively short, thus a complete solidification thereof requires either lengthy solidification or considerable amount of cooling medium (air), making it necessary to employ an apparatus with large overall dimensions, or resulting in incomplete solidification of drops of sulfur and of deformation of the drop at the moment of contacting with the bottom of the column. That is further associated not only with low effectivity of the process but also with operational troubles consisting in frequent cleaning of the column bottom and transport devices, difficulties in efficient and rapid setting of the object in operation, and a necessity to increase the number of operators. Moreover, the application of said method causes a pollution of the environment because of occurrence of intensive emission of dusts into the atmosphere. The substantial disadvantage of the known method consists in restriction of the size of produced grains of the granulated sulfur with partial deformation of the grain, high fraction of minus mesh (the size of granules smaller than the requested one), and in low mechanical resistance.

The object of the invention is to provide a method of granulation of sulfur, with high capacity, rendering it possible to obtain granules with large size with the possibility of controlling the size and with low fraction of minus and of plus mesh.

The method according to the invention consists in the solidification of liquid sulfur in air, the sulfur being introduced in counter-current into a vertical air stream having the linear velocity increasing downwards from the value lower than the critical velocity of the sulfur dust constituting the nuclei of crystallization—the smallest particles of solid sulfur—to a value higher than the critical velocity of granules being formed.

In the zone of introduction of sulfur, called the sprinkling zone, the air beyond the function of preliminary heat exchange fulfills the function of a carrier of nuclei of crystallization, and the properly chosen velocity thereof admits one to produce a saturated suspension of sulfur dust making impossible the emission thereof into the ambient atmosphere.

At the bottom of the stream an air velocity is maintained higher than the critical velocity of formed granules of sulfur which enables one to maintain them in fluidal phase for a period of dozen minutes or so, which is necessary for adequate solidification of the granules. The linear velocity of air so chosen enables a very slow falling-down of the granules, securing them from a secondary deformation and cracking. In this zone, called the zone of intensive cooling, follows the most intensive heat exchange.

In the described method granules can be produced, having facultative grain characteristics, changing the amount and the velocity of introduced air, whereby grains are obtained with high selectivity, with minimum content of undersized and of oversized grain, and with smooth spherical surface.

The solidification carried in an air stream with variable velocity secures the production of sulfur granules with high mechanical durability, since the drops of sulfur in the first phase of solidification are cooled very slowly with respect to contacting with heated air in the sprinkling phase, their contact with cold air in the zone of intensive cooling occurring after formation of the sheath, which brings into effect the formation of an amorphous sheath of sulfur on the external side of granules.

Under the conditions of high ambient temperature the described process is conducted with water as an additional cooling medium. Water at the temperature not exceeding 70° C. is atomized through nozzles or other atomizing devices at the place of emission of air into the atmosphere. The produced water mist falls down towards the column bottom and is deposited in the form of a thin film on the column walls within the zone of formation of granules. That water, at the cost of the heat taken from the column walls and the heat emitted in course of solidification of sulfur, evaporates partially or completely and together with air is emitted into the atmosphere or is partially taken off by the drain pipe disposed at the column bottom. Such method of introduction of water makes impossible its contact with sulfur in the course of the formation of granules both in the zone of saturated nuclei of crystallization and in the stream of liquid sulfur and the falling down of formed granules. That is of essential significance for the durability and mechanical resistance of the product, increasing simultaneously the output of the column.

The method according to the invention can be realized in an apparatus for granulation, having the form of a column with a circular, square or rectangular cross-section, wherein the variation of the air velocity is obtained through the variation of the cross-sectional area of the column, and also through employing a perforated sieve in its bottom. The cross-sectional area of the column increases upwards, whereby the column shows a form of an inverted frustum of a cone or a pyramid in the zone of intensive cooling, then the column widens into the form of a cylinder or prism in the zone of formation of granules, and further widens in the sprinkling zone. At the top of the column, built of any structural materials, devices are disposed for sprinkling with liquid sulfur. The operators's platform for the sprinkling devices is disposed centrically in the column roof and is insulated with walls. On the periphery of this room the column roof is open, and at this place the emission of air from the column follows. In the roof, at the place of emission of the air, the water atomizing device is disposed and at the bottom of the column the drain pipe located under the perforated sieve. In the zone of intensive cooling, above the perforated sieve, the offtake of the granulated sulfur onto a conveyor is arranged.

The method according to the invention realized in the described apparatus admits to obtain efficiency, determined as the ratio of the output to the cubature of the column, being almost three times higher than other methods.

EXAMPLE

Liquid sulfur having the temperature of 120°–149° C. is, by means of a pump, introduced on the roof of the granulating column, to the sprinklers, wherefrom in form of thin streams it flows downwards. In a counter-current to the sulfur, from the bottom of the column, through the perforated sieve, air is introduced with a linear velocity of 6 m/s. In the zone of intensive cooling there follows a gradual decrease of the linear velocity of air to 2 m/s. In the zone of forming of granules, between the zone of intensive cooling and the zone of intensification of nuclei of crystallization, the linear velocity of air of 1 m/s is applied. The velocity of flow of the air in the field of intensification of nuclei of crystallization is gradually reduced from 1 m/s to 0.5 m/s at the place of emission of air. The streams of liquid sulfur are, in the air, disrupted into drops meeting the particles of solid sulfur, carried by the suspension of air from the bottom upwards towards the column, and after contacting with a drop of liquid sulfur forming the nuclei of crystallization. Granulated sulfur is obtained, containing 92% of grains in the class of 1–5 mm, free of dust.

What is claimed is:

1. A method of granulation of sulfur, consisting in the solidification of liquid sulfur in a counter-current stream of air in a column, characterized in that liquid sulfur is introduced into a vertical air stream having the linear velocity increasing downwards, from a velocity lower than the critical velocity of sulfur dust in the sprinkling zone to a velocity higher than the critical velocity of the formed granule in the zone of intensive cooling.

2. A method as defined in claim 1, characterized in that at the place of emission of the air into the atmosphere water is atomized, so that said water in the form of a thin film flows down over the walls of the apparatus for granulation, in the zone of forming of granules.

3. A method as defined in claim 1, characterized in that air is introduced into the zone of intensive cooling of granules through a perforated sieve at the portion of said column with smallest cross-sectional area, the variable velocity being achieved through increase of the column cross-section area up to a maximum in the sprinkling zone.

* * * * *